United States Patent
Mahin et al.

(10) Patent No.: US 7,851,940 B2
(45) Date of Patent: Dec. 14, 2010

(54) METHODS AND APPARATUS FOR DC-DC CONVERTER HAVING INDEPENDENT OUTPUTS

(75) Inventors: Mir Mahin, Holland, PA (US); John Humenick, Lansdale, PA (US); Shashank Wekhande, Nashua, NH (US)

(73) Assignee: Allegro Microsystems, Inc., Worcester, MA (US)

( * ) Notice: Subject to any disclaimer, the term of this patent is extended or adjusted under 35 U.S.C. 154(b) by 129 days.

(21) Appl. No.: 11/554,756

(22) Filed: Oct. 31, 2006

(65) Prior Publication Data

US 2007/0097574 A1    May 3, 2007

Related U.S. Application Data

(60) Provisional application No. 60/732,023, filed on Nov. 1, 2005.

(51) Int. Cl.
*H02J 1/00* (2006.01)
*G05F 1/577* (2006.01)

(52) U.S. Cl. .................. 307/11; 323/267; 323/268; 323/269; 323/271; 323/272

(58) Field of Classification Search .............. 323/267, 323/268, 269, 270, 271, 272; 307/11
See application file for complete search history.

(56) References Cited

U.S. PATENT DOCUMENTS

| | | | |
|---|---|---|---|
| 5,481,178 A | 1/1996 | Wilcox et al. | |
| 5,525,895 A | 6/1996 | Fishman | |
| 5,731,694 A | 3/1998 | Wilcox et al. | |
| 5,994,885 A | 11/1999 | Wilcox et al. | |
| 6,031,362 A | 2/2000 | Bradley | |
| 6,075,295 A * | 6/2000 | Li | 307/39 |
| 6,100,678 A | 8/2000 | Hobrecht | |
| 6,144,194 A | 11/2000 | Varga | |
| 6,208,279 B1 | 3/2001 | Oprescu | |
| 6,304,066 B1 | 10/2001 | Wilcox et al. | |
| 6,307,356 B1 | 10/2001 | Dwelley | |
| 6,404,174 B1 | 6/2002 | Boudreaux, Jr. et al. | |
| 6,518,733 B1 | 2/2003 | Schenkel et al. | |
| 6,580,258 B2 | 6/2003 | Wilcox et al. | |
| 6,674,274 B2 | 1/2004 | Hobrecht et al. | |
| 6,781,467 B2 * | 8/2004 | Sun | 330/295 |
| 7,315,153 B2 * | 1/2008 | Tazawa et al. | 323/272 |
| 7,432,614 B2 * | 10/2008 | Ma et al. | 307/31 |
| 2005/0036255 A1 | 2/2005 | Kranz | |

(Continued)

OTHER PUBLICATIONS

Richtek Technology Corp., High Performance, OLED + LED Driver for Dual Panel Mobile Phone, Mar. 2005, pp. 1-14, Richtek Technology Corp., Hsinchu, Taiwan, R.O.C.

(Continued)

*Primary Examiner*—Hal I Kaplan
(74) *Attorney, Agent, or Firm*—Daly, Crowley, Mofford & Durkee, LLP

(57) ABSTRACT

A DC-DC converter includes independent first and second outputs to drive respective first and second loads from a common boost module. In one embodiment, a first linear regulator controls a first controlling device for the first output and a second linear regulator controls a second controlling device for the second output. The load requiring the higher voltage controls the boost module.

23 Claims, 5 Drawing Sheets

U.S. PATENT DOCUMENTS

2006/0033482 A1* 2/2006 Florence et al. ............. 323/267
2008/0030178 A1   2/2008 Leonard et al.

OTHER PUBLICATIONS

National Semiconductor, Integrated White LED Driver with Organic LED Display Power Supply, Sep. 2005, pp. 1-14.

Texas Instruments Incorporated, Dual Output Boost Regulator Using Single Inductor,, Jan. 2006, pp. 1-24, Texas Instruments Inc., Dallas, TX.

California Micro Devices, Asymmetrical High Efficiency Two Channel Boost LED/OLED Driver, May 25, 2006, pp. 1-9, California Micro Devices, Milpitas, CA.

Texas Instruments Incorporated, TI Introduces Dual-Output Boost Converters for OLED and White LED Displays, Apr. 17, 2006, pp. 1-2, Texas Instruments Inc., Dallas, TX.

Maxim Integrated Products, High-Efficiency, 26V Step-Up Converters for Main and Subdisplays Using OLEDs and/or White LEDs, Oct. 2005, 11 pp., Maxim Integrated Products, Sunnyvale, CA.

International Preliminary Report on Patentability (Chapter 1 of the Patent Cooperation Treaty) PCT/US2006/042441 dated May 15, 2008 (Form PCT/IB/326) pp. 1-7.

Notification of transmittal of the International Search Report and the Written Opinion of the International Searching Authority, or the Declaration dated Oct. 26, 2007 (Form PCT/ISA/220). International Search Report (Form PCT/ISA/210). Written Opinion of the International Searching Authority (Form PCT/ISA/237).

* cited by examiner

METHODS AND APPARATUS FOR DC-DC CONVERTER HAVING INDEPENDENT OUTPUTS

CROSS REFERENCE TO RELATED APPLICATIONS

The present application claims the benefit of U.S. Provisional Patent Application No. 60/732,023, filed on Nov. 1, 2005, which is incorporated herein by reference.

STATEMENT REGARDING FEDERALLY SPONSORED RESEARCH

Not Applicable.

BACKGROUND

As is known in the art, DC-DC converters are used to drive a variety of loads. For example, DC-DC converters can be used to drive LEDs (light emitting devices), such as LEDs present in cell phones. However, known DC-DC converters are limited to driving one type of device, e.g., LED, at a given time. For example, Part No. LM3520 Integrated White LED Driver with Organic LED Display Power Supply by National Semiconductor Corporation has a first mode in which WLEDs are driven and a second mode in which organic LEDs (OLEDs) are driven. The OLEDs and WLEDs are not driven at the same time.

SUMMARY

The present invention provides a DC-DC converter having independently enabled outputs driven by a common boost circuit. With this arrangement, first and second loads can be energized simultaneously to provide efficient operation and load regulation. While the inventive DC-DC converter is shown and described primarily in conjunction with organic light emitting diodes (OLEDS) and white light emitting diodes (WLEDs), it is understood that the invention embodiments are applicable to a wide range of circuits, loads, and applications. While the inventive DC-DC converter described herein has a boost type configuration, it is understood that the invention can be readily extended to other types of DC-DC converter topologies.

In one aspect of the invention, a DC-DC converter circuit includes a boost circuit to boost an input voltage, a first output to drive a first load, and a second output to drive a second load. The first and second outputs are coupled to the boost circuit and independently enabled and controlled. A boost loop control module is coupled to the boost circuit to control voltage supplied to the first and second outputs based upon which of the first and second outputs requires a higher voltage.

In one embodiment, the boost circuit includes a first switching element having a conduction state controlled by the boost loop control module. A first controlling device is connected between the boost circuit and to the first output with a first linear regulator controlling a conduction state of the second controlled device. A second controlling device is connected between second output and ground with a second linear regulator controlling a conduction state of the second controlled device. In an exemplary embodiment, the second linear regulator drops voltage that exceeds a voltage level required by the second load.

In another aspect of the invention, a method of providing a DC-DC converter circuit includes coupling a first output to a boost circuit having a first controlling device and coupling a second output to the boost circuit having a second controlling device. The method further includes coupling the first switching element to a boost loop control module and coupling feedback paths from the first and second outputs to the boost loop control module. First and second enable signal paths can be coupled to a module coupled to the boost loop control module to independently enable the first and second outputs.

In one embodiment, the method further includes providing the boost loop module to be controlled by the first or second outputs based upon which of the first and second outputs requires a higher voltage. A first linear regulator can be coupled to a first controlling device coupled to the first output and a second linear regulator can be coupled to the second controlling device coupled to the second output.

BRIEF DESCRIPTION OF THE DRAWINGS

The exemplary embodiments contained herein will be more filly understood from the following detailed description taken in conjunction with the accompanying drawings, in which.

DETAILED DESCRIPTION

Figure 1:
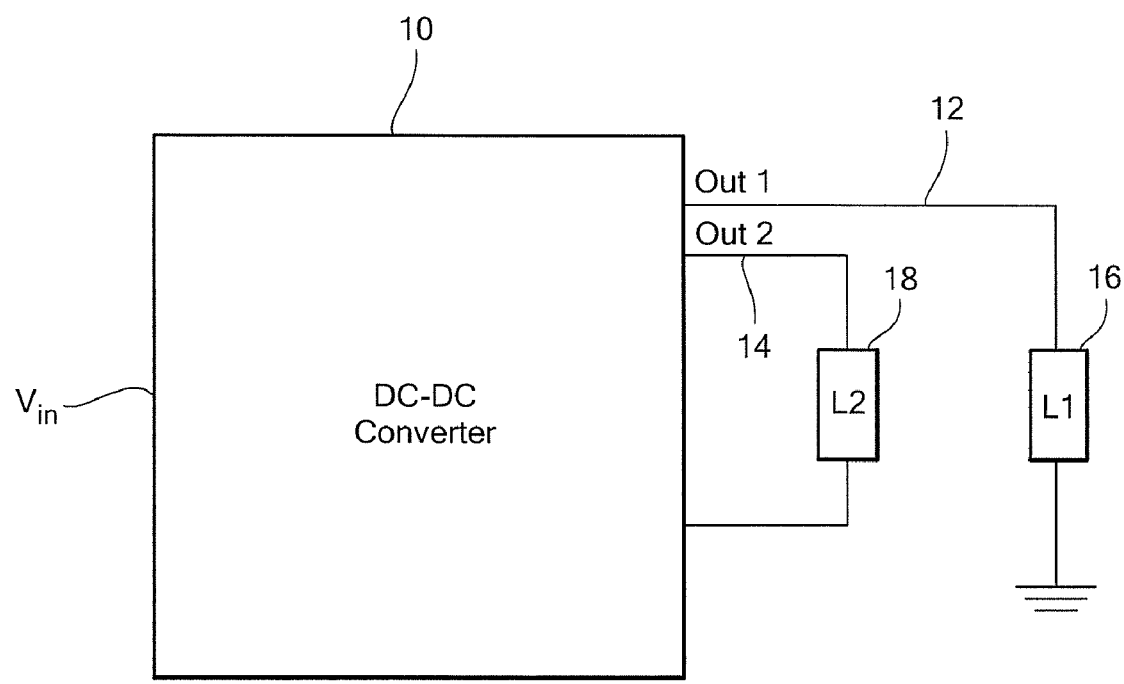
FIG. 1 is a high level block diagram of a DC-DC converter having independently enabled first and second outputs in accordance with the present invention.

FIG. 1 shows a block diagram of a DC-DC converter 10 having independently enabled of first and second outputs 12, 14 coupled to a common boost circuit. The first output 12 drives a first load 16 and the second output 14 drives a second load 18. In an exemplary embodiment, the converter includes a step-up DC-DC converter followed by two linear regulators to independently enable the two outputs. With this arrangement, the inventive multi-output converter utilizes a common boost stage to achieve enhanced efficiency and load regulation.

Figure 2:
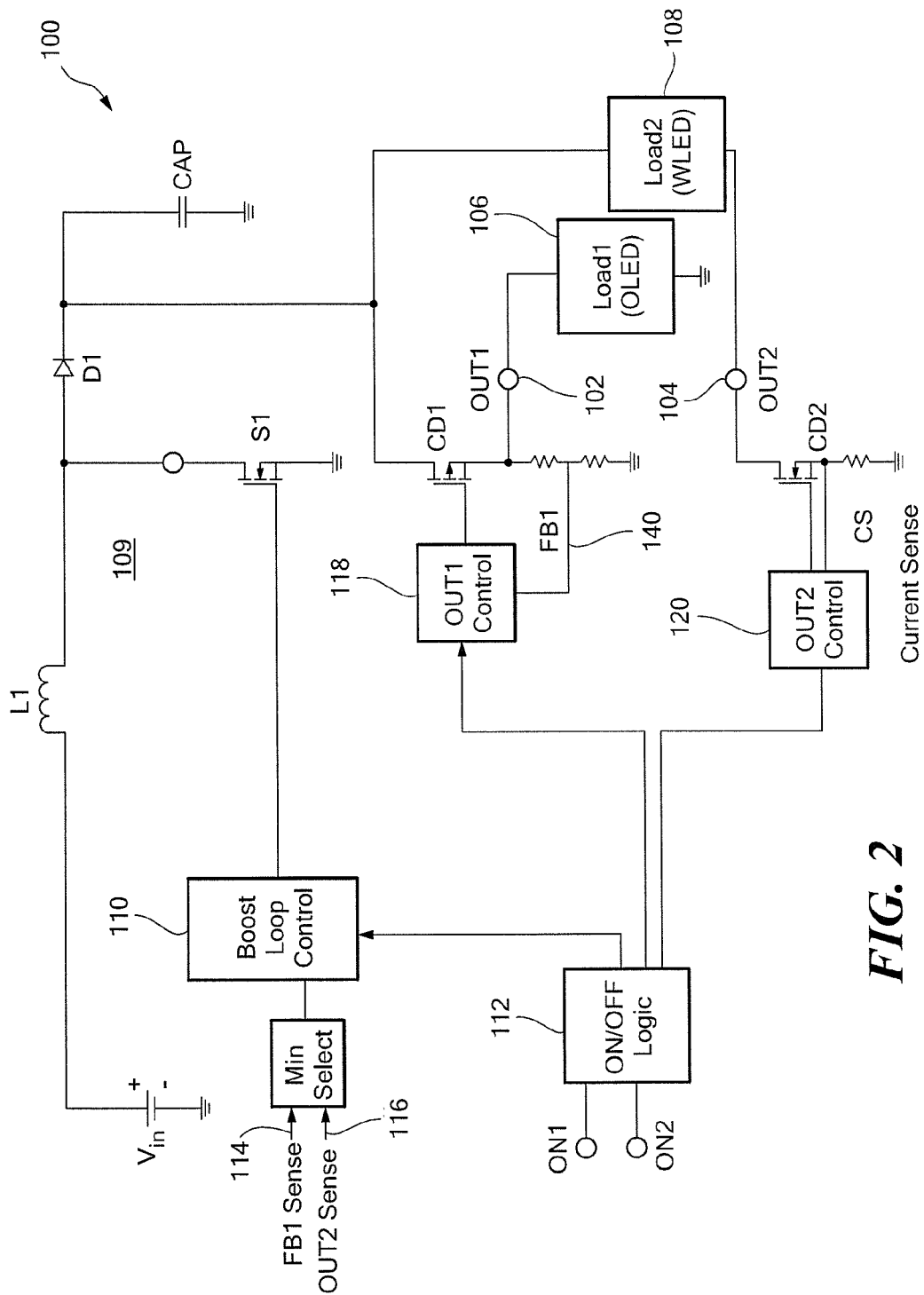
FIG. 2 is a schematic depiction of a DC-DC converter having independent first and second outputs in accordance with the present invention.

FIG. 2 shows a DC-DC converter circuit 100 having a common boost stage controlling first and second outputs 102, 104 independently. The first output 102 can be coupled to a first load 106, such as OLED (organic Light Emitting Devices). The second output 104 can be coupled to a second load 108, such as WLEDs (white Light Emitting Devices). While the converter 100 is shown driving OLED and WLED loads, it is understood that any type of loads can be independently energized.

A first switching device S1, an inductor L1, and diode D1 form a step-up DC-DC boost circuit 109 for an input voltage Vin in a manner well known to one of ordinary skill in the art. The diode D1 is referenced to ground via capacitor CAP. A boost loop control module 110 controls the conductive state of the first switching device S1, which can be provided as a MOSFET (metal oxide semiconductor field effect transistor) device, based upon input from a ON/OFF module 112, which receives first and second enable signals ON1, ON2. The boost loop module 110 also receives and a first feedback signal 114 from the first output feedback FB1 140 and a second feedback signal 116 from the second output 104, as described more fully below. In one embodiment, the ON1 signal enables the first output 102 to energize the first load 106 and the ON2 signal enables the second output 104 to energize the second load 108 so that the first and second outputs 102, 104 are independently enabled. The boost circuit 109 steps up an input voltage Vin to sufficient levels to drive the first and second loads 106, 108. It is understood that the voltage requirements for the first and second loads 106, 108 may differ from each other.

A first controlling device CD1 drives the first load 106 and a second controlling device CD2 drives the second load 108 with the appropriate voltage and current levels. The first controlling device CD1 is controlled by a first control module 118, which receives control signals from the ON/OFF circuit 112 and FB1. A second output module 120 receives control signals from the ON/OFF circuit 112 and controls the conductive state of the second controlling device CD2 to control current levels and receive current level information via sense resistor CS.

In operation, the first and second outputs 102, 104 independently drive the first and second loads 106, 108 from a common boost circuit 109 under the control of the respective first and second control modules 118, 120 with feedback 114, 116 from the respective loads, as described more fully below.

Figure 3:
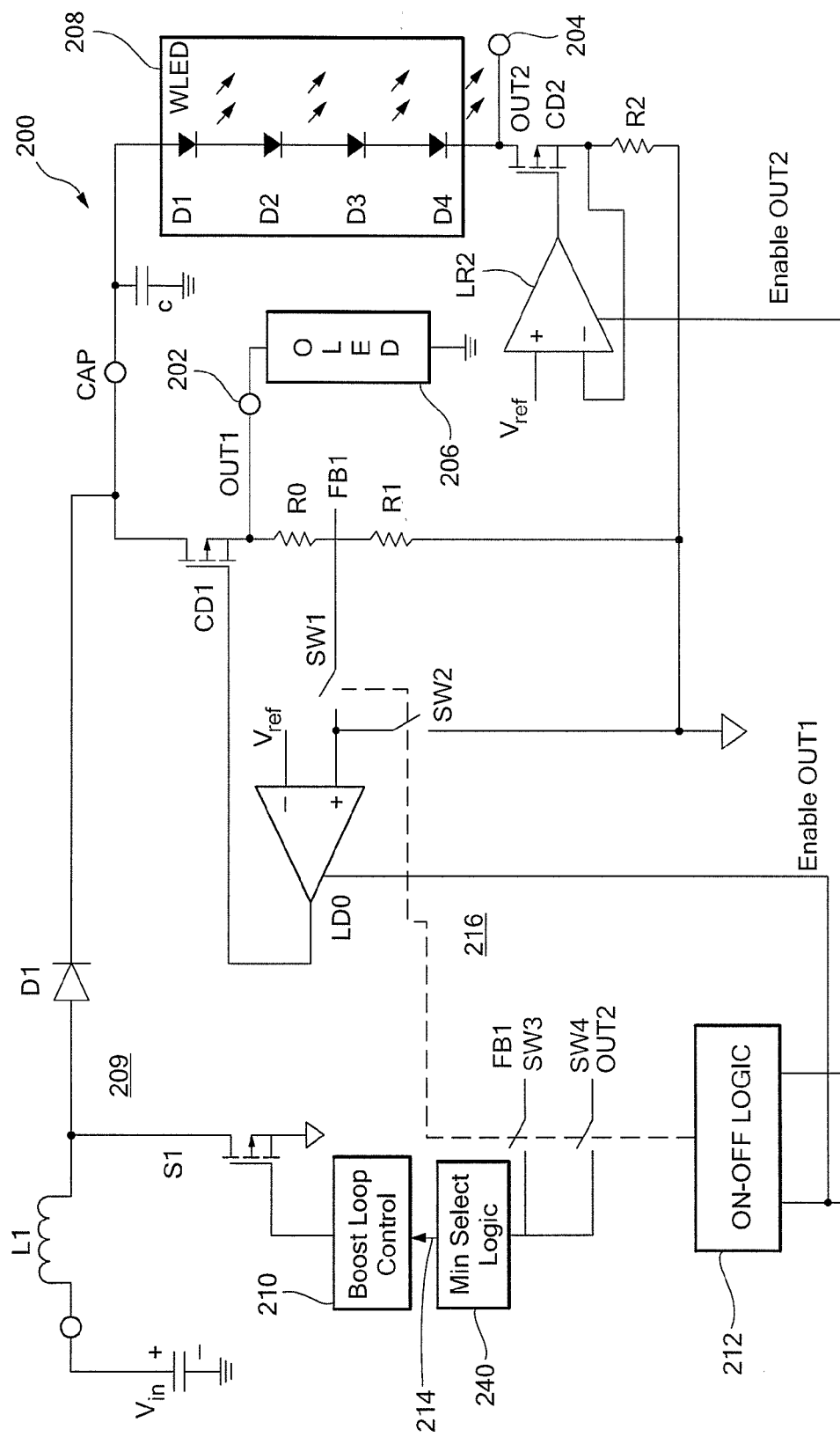
FIG. 3 is a further schematic depiction of a DC-DC converter in accordance with the present invention.

FIG. 3 shows an exemplary implementation of a DC-DC converter 200 having first and second outputs 202, 204 to drive first and second loads 206, 208 independently from a single boost circuit 209 formed from an inductor L1, a diode D1, and a first switching element S1. A boost loop control module 210 controls the boost circuit 209. In one particular embodiment, the first load 206 includes OLED and the second load 208 includes WLEDs.

The first switching device S1 is controlled by the boost loop control module 210. The first controlling device CD1 for the first (OLED) output 202 is controlled by a low dropout regulator LDO and the second controlling device CD2 for the second output 204 is controlled by a second linear regulator LR2. Low dropout voltage linear regulators, with typical 500 mV dropout voltage for example, are well known to one of ordinary skill in the art.

An ON-OFF module 212 receives a first enable signal ON1 to enable the first output 202 and a second enable signal ON2 to enable the second output 204. In one particular embodiment, an active ON1 signal indicates that the first load 206 should be energized and an active ON2 signal indicates that the second load 208 should be energized. Thus, for the first and second outputs 202, 204, both can be on, both can be off, the first output can be on while the second is off, and the first output can be off while the second is on. The ON-OFF module 212 transmits information to the boost loop control module 210 and controls switches, as described more fully below.

In one embodiment, the second (WLED) output 204 is driven by a constant current sink and the first (OLED) output 202 controls the output voltage of the OLED. OUT1 is a constant voltage type output and OUT2 is constant current type output. The constant output voltage is controlled by sampling output voltage through resistor divider R0-R1. Typical feedback voltage is about 0.6V. The constant current sink needs a minimum voltage for operation. In the illustrated embodiment, this voltage is about 0.6V. The boost loop is controlled to a smallest voltage on FB1 and OUT2 to ensure minimum voltage required to voltage output on OUT1 and current through OUT2.

A switch matrix 216 includes a series of switches, which are described below, controlled by the ON/OFF logic module 212 for feedback signals provided by first output feedback FB1 or VOUT2 voltage to the boost loop control module 210. It is understood that FB1 and OUT2 can be scaled to desired values to meet the needs of a particular application.

A boost loop control signal 214 provides feedback to the boost loop control module 210 based upon signal information from a minimum select logic circuit 240. A resistance divider provided from first and second resistors R0, R1 generates a first feedback voltage signal FB1 corresponding to the OUT1 output voltage. A second feedback signal OUT2 corresponds to a voltage at the second output node.

In an exemplary embodiment, the switch matrix 216 includes a first switch SW1, which when closed, provides the first feedback signal FB1 to a first input of the low dropout regulator LDO, which also receives a reference voltage input at a second input. The first controlling device CD1 acts as an LDO when the first switch SW1 is on. A second switch SW2 in the switch matrix 216, when closed, couples the first input of the low dropout regulator LDO to ground to provide a high gain comparator. This completely turns on the first controlling device CD1, which acts as a low resistance switch.

In the illustrated embodiment, the switch matrix 216 includes a third switch SW3, which when closed, provides the first feedback signal FB1 to the minimum select logic 240, and a fourth switch SW4, which when closed, provides the second feedback signal OUT2 to the minimum select logic 240. The minimum select logic 240 selects the lower voltage of signals OUT2 and FB1 to determine which output needs higher output voltage on the CAP node. In the illustrated embodiment, signals FB1 and OUT1 are assumed to have similar reference levels, but it is understood that with different scaling these levels can be changed. The output of the minimum select logic circuit 240 is connected to the input of the boost loop control module 210 to regulate the boost stage 209.

In general, the boost loop 209 is controlled by the output, either the first or second load 206, 208, requiring higher voltage. For example, driving the OLED output 206 may require about 18V and driving three WLEDs 208 may require about 12V on CAP node. In this case, the OLED output 202 needs more voltage at the boost regulator output so that controls the boost loop 209 so that the third switch SW3 is closed. Excess voltage for the WLEDs 208 at the second output 204 is dropped by the second controlling device CD2 by operating it in linear region.

If five WLEDs are present, for example, then about 20V is required for the second load 208. In this case, the WLED requirements control the output voltage of the boost loop (fourth switch SW4 closed) since the necessary voltage (20V) for second output 208 for the five WLEDs is greater than the 18V needed by the OLED. Excess voltage for OUT1 is dropped across the first controlling device CD1 by operating it in linear region.

In the illustrated embodiment, the first controlling device CD1 at the first output 202 is provided as a PMOS device and the second controlling device CD2 at the second output 204 is provided as an NMOS device. It will be readily apparent to one of ordinary skill in the art that various types of suitable devices can be used.

In one embodiment, the WLED output 204 is a current mirror type output. The current mirror works as a current sink including the second linear regulator/amplifier LR2, an NMOS-type device CD2, and a current sensing resistor R2. A string of WLED forming the second load 208 is connected between the CAP pin and the second output 204.

It is understood that the circuit embodiments can have a variety of input/output (I/O) connections. In the illustrated embodiment, the converter includes I/Os, which can be provided as pins on a device, shown as CAP, ON1, ON2, Vin, OUT1, and OUT2. It is understood that converter embodiments can include other I/O pins and connections.

In one embodiment, the OLED output 202 comes from the source terminal of the first controlling device CD1, which is provided as a PMOS device in the illustrated embodiment. The first controlling device CD1 is connected to the CAP pin. The PMOS devices CD1 acts as a switch or as a pass transistor of the low dropout regulator LDO depending on whether the OUT1 or OUT2 signal is controlling the boost regulator loop.

If the WLED load 208 requires a higher voltage at the CAP pin when OUT1 is controlling the boost stage, the WLED output 204 takes over control of the boost loop (SW4, SW1 closed and SW2 open) so that the voltage on the second output 204 controls boost loop. At this time the OLED output 202 is controlled by the first controlling element CD1 via the low dropout regulator LDO. The resistance divider voltage signal FB1 goes via SW1 to the low dropout regulator LDO, which controls the first controlling device CD1 as a pass transistor. The boost regulator controls the voltage at OUT2 204 (SW4 closed) and the low dropout regulator LDO controls the OLED output 202.

If the OLED output 202 is out of regulation, more voltage is required at the CAP pin. The OLED output 202 takes over the control of the boost loop. In this situation, the first switch SW1 opens and the second switch SW2 closes. The low dropout regulator LDO now operates as a high gain comparator and drives the PMOS first controlling device CD1 as a switch. The resistance divider voltage signal FB1 goes back to the boost loop control module 210 as a feedback voltage via the third switch SW3.

In one embodiment, the ON-OFF logic module 212 controls the switches SW1, SW2, SW3, SW4, in the switch matrix 216. While not shown, the ON-OFF logic module 212 can receive the feedback signals FB1, OUT2 to control the switches in the switch matrix 216.

It is understood that a variety of alternative switch configurations can be used to meet the needs of a particular application. Switches can be located in one or more of the boost loop control module and the ON-OFF logic module.

It is understood that switchover from one output to the other may cause continuous toggling if the first and second outputs are close to each other. This can be avoided by adding hysteresis where the loop takes and releases control and/or time delays in a manner well known to one of ordinary skill in the art.

Figure 4:
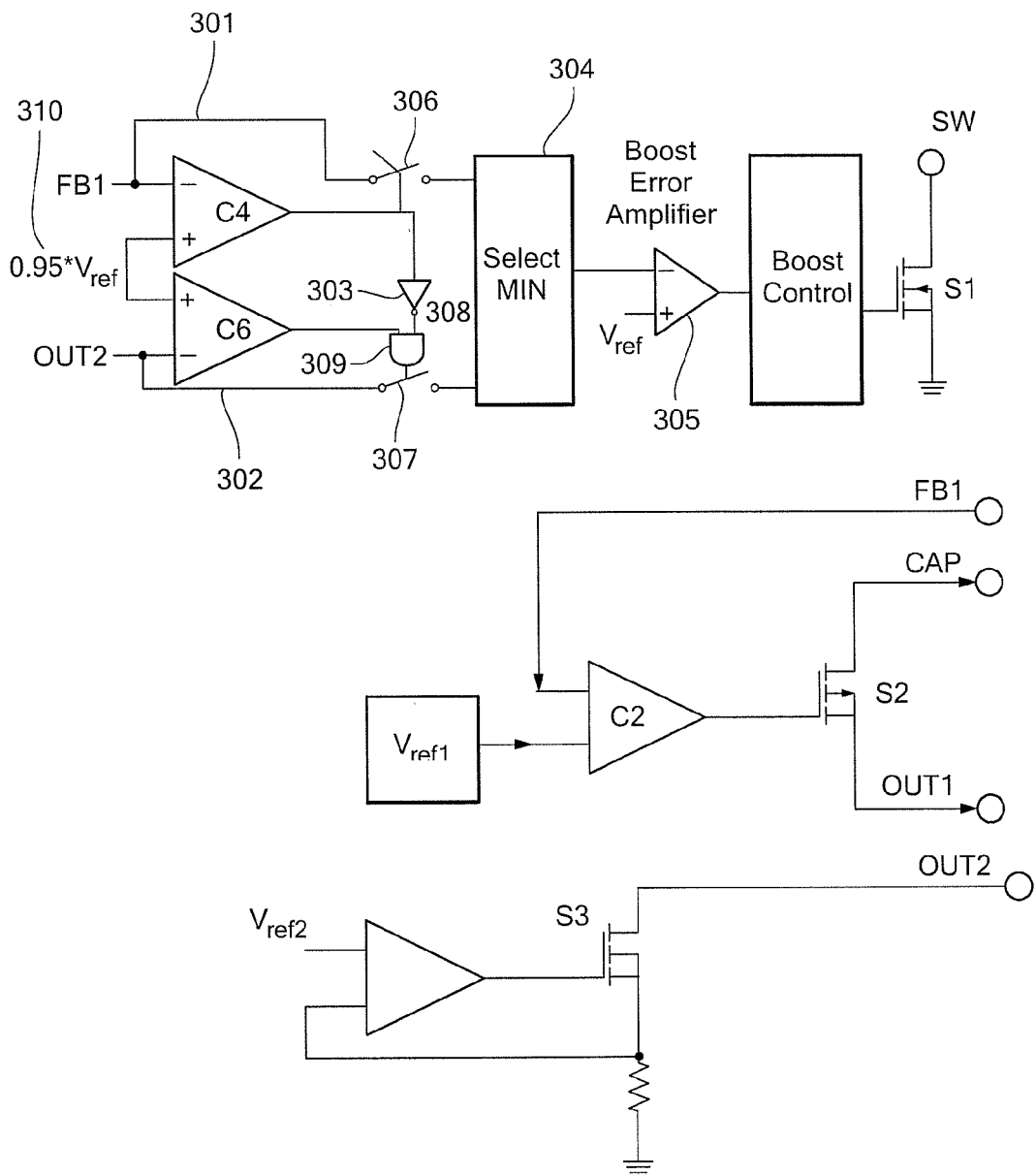
FIG. 4 is a schematic depiction showing minimum select block circuitry for boost feedback.

FIG. 4 shows an exemplary configuration to provide hysteresis. Feedback signals FB1 (301) and OUT2 (302) are compared with 0.95×Vref (310) by comparators C4 and C6, respectively. When any feedback falls below 0.95×Vref, the corresponding comparator output goes high. Switches 306 and 307 connect feedback via logic elements 303, 308, 309 with the lower value via selector 304 to a boost error amplifier 305 to regulate the boost loop. When comparator C4 is high, switch 306 turns on and when comparator C6 is high switch 307 turns on. If both comparator outputs are high, one of the outputs can be the master. In the illustrated embodiment, comparator C4 is the master. When comparator C4 is high, feedback signal FB1 regulates the boost. The feedback voltage that drops below 0.95×Vref now controls the boost. This feedback is compared to the reference voltage Vref by the error amplifier 305 and brings it to the voltage reference Vref level. The voltage margin for the other output automatically increases.

Figure 5:
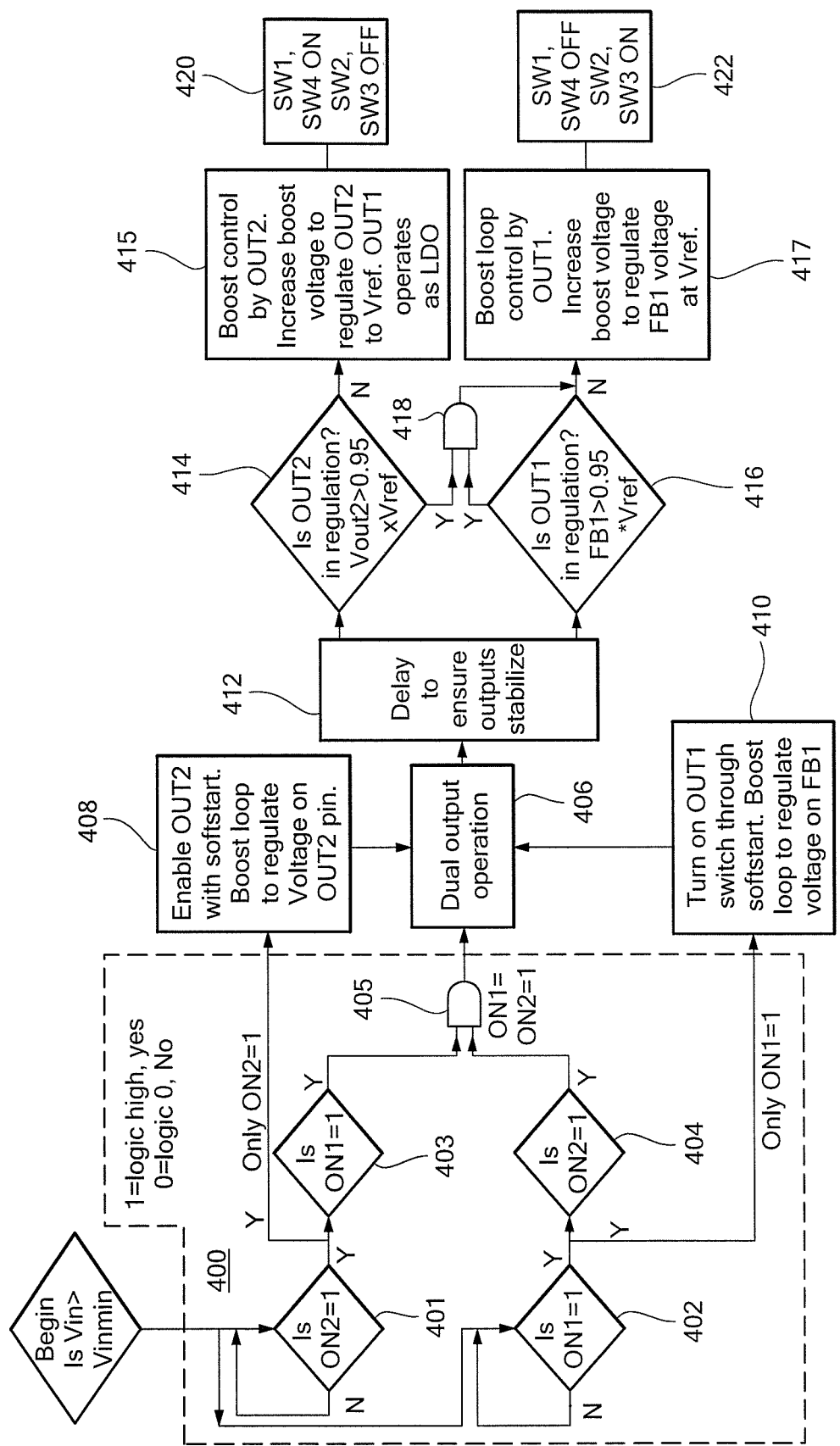
FIG. 5 is a flow diagram of an exemplary sequence of steps to provide operation of a DC-DC converter in accordance with the present invention.

FIG. 5, in conjunction with FIGS. 3 and 4, shows an exemplary sequence of steps for DC-DC converter operation in accordance with the present invention. In general, the OLED load 206 is coupled to the first input 202 and a WLED load 208 is coupled to the second output 204. It is determined which output should be enabled depending status on ON1 and ON2. It is also determined which of the OLED load 206 and WLED load 208 requires a greater voltage level. Boost loop control is assigned to minimum voltage level feedback, as described below.

In block 400, the converter is energized when input voltage is sufficient to power up the converter. It is understood that the determination of whether ON1 and ON2 are logical ONES (high) occurs in parallel. That is, the result of steps 401 and 402 are used in steps 403 and 404. More particularly, if ON1 and ON2 are both ONE, as determined by the AND gate 405, dual output operation processing 406 occurs. If only the ON2 signal was HIGH, then OUT2 is enabled with a soft start and boost loop regulates voltage on the OUT2 pin in step 408 until dual output operation begins in step 406. Similarly, if only the ON1 signal is HIGH, then in step 410 the OUT1 switch is turned on through soft start so that the boost loop regulates the voltage on FB1.

After a delay in step 412 to ensure stable outputs, in step 414, it is determined whether OUT2 is in regulation. If not, in step 415 boost control by OUT2 increases the boost voltage to regulate OUT2 to the voltage reference Vref and OUT1 operates as a LDO with SW1 and SW4 ON and SW2 and SW3 OFF as in step 420. In step 416, it is determined whether OUT1 is in regulation, e.g., whether FB1 is greater than 0.95 times the reference voltage Vref. If not, in step 417 the boost loop control by OUT1 increases the boost voltage to regulate feedback FB1 to the reference voltage Vref. An AND gate 418 makes the OUT1 regulation dominant over OUT2 regulation with SW1 and SW4 OFF and SW2 and SW3 ON, as in step 422.

While the invention is primarily shown and described in conjunction with certain applications and loads, it is understood that the invention is applicable to converters in general in which it is desirable to drive multiple loads with a boost circuit. A variety of other applications, loads, and topologies will be readily apparent to one of ordinary skill in the art without departing from the present invention.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A DC-DC converter circuit, comprising:
   a boost circuit to boost an input voltage;
   a first output for coupling to a first load and a second output for coupling to a second load, the first and second outputs being coupled to and driven by the boost circuit, wherein the first and second outputs are independently enabled;
   a boost loop control module directly coupled to the boost circuit to control voltage supplied to the first and second outputs based upon which of the first or second output requires a higher boost voltage;
   a first feedback path for a first feedback signal from the first output and a second feedback path for a second feedback signal from the second output;
   a switch matrix to provide the first and second feedback paths; and
   a minimum select circuit to receive the first and second feedback signals for determining which of the first and second outputs requires a higher output voltage.

2. The circuit according to claim 1, wherein the boost circuit includes a first switching element having a conduction state controlled by the boost loop control module.

3. The circuit according to claim 2, further including a first controlling element coupled to the boost circuit and to the first output.

4. The circuit according to claim 3, further including a linear regulator to control a conduction state of the first controlling element.

5. The circuit according to claim 4, wherein the linear regulator drops voltage that exceeds a voltage level required by the first load.

6. The circuit according to claim 3, further including a second controlling element coupled to the second output, wherein second output is connected between boost output and second controlling element.

7. The circuit according to claim 6, further including a linear regulator to control a conduction state of the second controlling element.

8. The circuit according to claim 7, wherein the linear regulator drops voltage that exceeds a voltage level required by the second load.

9. The circuit according to claim 1, further including first and second load terminals to energize the first load, wherein the first load terminal is coupled to the first output and the second load terminal is coupled to ground.

10. A circuit, comprising:
a DC-DC converter, including
a boost circuit including an inductor, a diode and a first switching device;
a boost loop control module to control a conduction state of the first switching device, the boost loop control module directly coupled to the boost circuit;
a first controlling device coupled to the boost circuit;
a first output controlled by the first controlling device for driving a first load;
a second controlling device coupled to the boost circuit through a second output, the second output controlled by the second controlling device for driving a second load, the first and second outputs being independently enabled, wherein the boost loop control module controls the first switching device based upon which of the first and second outputs requires a higher voltage;
a linear regulator coupled to the first controlling element;
a first feedback path to provide feedback information for the first output voltage; and
a first switch to couple the first feedback path to an input of the linear regulator.

11. The circuit according to claim 10, further including a second feedback path to provide feedback information from the second output node and a second switch to couple the second feedback path to the input of the linear regulator.

12. The circuit according to claim 10, further including a linear regulator coupled to the second controlling element, the linear regulator dropping voltage to the second output that is in excess of what is required by the second load.

13. The circuit according to claim 10, further including a hysteresis circuit for feedback signals from the first and second outputs.

14. The circuit according to claim 13, wherein the hysteresis circuit includes circuitry to compare at least one of the feedback signals from the first and second outputs against 0.95 times a reference voltage.

15. The circuit according to claim 10 further including a time delay circuit to transfer control between the first output and the second output.

16. A circuit, comprising:
a DC-DC converter, including
a boost circuit including an inductor, a diode and a first switching device;
a boost loop control module to control a conduction state of the first switching device, the boost loop control module directly coupled to the boost circuit;
a first controlling device coupled to the boost circuit;
a first output controlled by the first controlling device for driving a first load;
a second controlling device coupled to the boost circuit through a second output, the second output controlled by the second controlling device for driving a second load, the first and second outputs being independently enabled, wherein the boost loop control module controls the first switching device based upon which of the first and second outputs requires a higher voltage; and
a first enable input to enable the first output and a second enable input to enable the second output.

17. A circuit, comprising:
a DC-DC converter, including
a boost circuit including an inductor, a diode and a first switching device;
a boost loop control module to control a conduction state of the first switching device, the boost loop control module directly coupled to the boost circuit;
a first controlling device coupled to the boost circuit;
a first output controlled by the first controlling device for driving a first load;
a second controlling device coupled to the boost circuit through a second output, the second output controlled by the second controlling device for driving a second load, the first and second outputs being independently enabled, wherein the boost loop control module controls the first switching device based upon which of the first and second outputs requires a higher voltage; and
a minimum select circuit for determining which of the first and second outputs requires a higher output voltage.

18. A method of providing a DC-DC converter circuit, comprising:
coupling a first output to a boost circuit having a first switching element;
coupling a second output to the boost circuit;
coupling the first switching element to a boost loop control module;
coupling the boost loop control module directly to the boost circuit;
coupling feedback paths from the first and second outputs to the boost loop control module; and
coupling first and second enable signal paths to an ON-OFF module coupled to the boost loop control module to independently enable the first and second outputs.

19. The method according to claim 18, further including providing the boost loop control module to control the first and second outputs based upon which of the first and second outputs requires a higher voltage.

20. The method according to claim 18, further including coupling a linear regulator to the first switching element.

21. A DC-DC converter circuit, comprising:
a boost circuit to boost an input voltage;
a first output for coupling to a first load and a second output for coupling to a second load, the first and second outputs being coupled to and driven by the boost circuit, wherein the first and second outputs are independently enabled; and a boost loop control module coupled to the boost circuit to control voltage supplied to the first and second outputs based upon which of the first or second output requires a higher boost voltage, wherein the first output is a constant voltage output and the second output is a constant current output.

22. A DC-DC converter circuit, comprising:

a boost circuit to boost an input voltage;

a first output for coupling to a first load and a second output for coupling to a second load, the first and second outputs being coupled to and driven by the boost circuit, wherein the first and second outputs are independently enabled;

a boost loop control module directly coupled to the boost circuit to control voltage supplied to the first and second outputs based upon which of the first or second output requires a higher boost voltage, wherein the boost circuit includes a first switching element having a conduction state controlled by the boost loop control module;

a first controlling element coupled to the boost circuit and to the first output; and a first device to control a conduction state of the first controlling element, wherein the first controlling element selectively operates as a pass transistor of a linear regulator and a switch.

23. The circuit according to claim 22, wherein the first controlling element is operative to:

act as a switch when only first output is enabled, act as a switch when the first and second outputs are enabled and first output is greater than second output, and act as a pass transistor of a linear regulator when the first and second outputs are enabled and first output is smaller than second output.

* * * * *

UNITED STATES PATENT AND TRADEMARK OFFICE
CERTIFICATE OF CORRECTION

PATENT NO.         : 7,851,940 B2
APPLICATION NO.    : 11/554756
DATED              : December 14, 2010
INVENTOR(S)        : Mahin et al.

It is certified that error appears in the above-identified patent and that said Letters Patent is hereby corrected as shown below:

Col. 1 line 26, delete "WLEDS" and replace with --white Light Emitting Devices (WLEDs)--.

Col. 1 line 59, delete "between second" and replace with --between the second--.

Col. 2 line 39, delete "of".

Col. 2 line 51, delete "OLED" and replace with --OLEDs--.

Col. 2 line 55, delete "loads" and replace with --load--.

Col. 2 line 57, "and diode D1" and replace with --and a diode D1--.

Col. 2 line 66 "receives and a" and replace with --receives a--.

Col. 3 line 32, delete "OLED" and replace with --OLEDs--.

Col. 3 line 56, delete "is constant" and replace with --is a constant--.

Col. 3 line 57-58, delete "by sampling" and replace with --by a sampling--.

Col. 4 line 39, delete "on CAP" and replace with --on the CAP--.

Col. 4 line 40-41, delete "that controls" and replace with --that it controls--.

Col. 4 line 63, delete "WLED" and replace with --WLEDs--.

Col. 5 line 8, delete "devices" and replace with --device--.

Col. 6 line 3, delete "depending status" and replace with --depending on the status of--.

Signed and Sealed this
First Day of March, 2011

David J. Kappos
*Director of the United States Patent and Trademark Office*

CERTIFICATE OF CORRECTION (continued)
U.S. Pat. No. 7,851,940 B2

Col. 6 line 15-16, delete "and boost" and replace with --and the boost--.

Col. 6 line 23, delete "step 415 boost" and replace with --step 415 the boost--.

Col. 6 line 58, delete "output" and replace with --outputs--.